United States Patent [19]

Lett

[11] Patent Number: 5,539,822
[45] Date of Patent: Jul. 23, 1996

[54] SYSTEM AND METHOD FOR SUBSCRIBER INTERACTIVITY IN A TELEVISION SYSTEM

[75] Inventor: David B. Lett, Duluth, Ga.

[73] Assignee: Scientific-Atlanta, Inc., Norcross, Ga.

[21] Appl. No.: 229,717

[22] Filed: Apr. 19, 1994

[51] Int. Cl.[6] .......................... H04N 7/167; H04N 7/10; H04N 7/14

[52] U.S. Cl. .................................. 380/20; 348/2; 348/3; 348/12; 348/13

[58] Field of Search ........................ 455/2, 5, 4.2, 5.1; 380/20; 348/12, 13, 17, 1, 3, 2, 7

[56] References Cited

U.S. PATENT DOCUMENTS

| | | |
|---|---|---|
| 4,876,592 | 10/1989 | Von Kohorn . |
| 4,885,775 | 12/1989 | Lucas . |
| 4,890,321 | 12/1989 | Seth-Smith et al. . |
| 4,926,255 | 5/1990 | Von Kohorn . |
| 4,991,011 | 2/1991 | Johnson et al. . |
| 4,994,908 | 2/1991 | Kuban . |
| 5,003,384 | 3/1991 | Durden et al. . |
| 5,034,807 | 7/1991 | Von Kohorn . |
| 5,053,883 | 10/1991 | Johnson . |
| 5,057,915 | 10/1991 | Von Kohorn . |
| 5,058,160 | 10/1991 | Banker et al. . |
| 5,077,607 | 12/1991 | Johnson et al. . |
| 5,128,752 | 7/1992 | Von Kohorn . |
| 5,142,690 | 8/1992 | McMullan, Jr. et al. . |
| 5,155,590 | 10/1992 | Beyers, II et al. . |
| 5,157,716 | 10/1992 | Naddor et al. . |
| 5,225,902 | 7/1993 | McMullan, Jr. . |
| 5,227,874 | 7/1993 | Von Kohorn . |
| 5,247,364 | 9/1993 | Banker et al. . |
| 5,249,044 | 9/1993 | Von Kohorn . |
| 5,260,778 | 11/1993 | Kauffman et al. . |
| 5,270,809 | 12/1993 | Gammie et al. . |
| 5,283,734 | 2/1994 | Von Kohorn . |
| 5,381,477 | 1/1995 | Beyers et al. ........................ 380/20 |

B1 4,745,468   6/1991   Von Kohorn .

OTHER PUBLICATIONS

P. Lambert, Multichannel News, 24 Jan. 1994, p. 37, 38.
European Search Report dated May 4, 1992.
1989 IEEE International Solid-State Circuits Conference; A 45ns 16Mb DRAM with Triple-Well Structure; Syuso Fujii et al., pp. 248-249 and 354.

*Primary Examiner*—Stephen C. Buczinski
*Attorney, Agent, or Firm*—Banner & Allegretti, Ltd.

[57] ABSTRACT

A system for providing interactive services in a subscription television system comprises a system network controller for controlling the interactive services having controller memory for storing subscriber terminal identification data, transaction identification data and transaction return data, and a processor, coupled to the controller memory, for generating a transaction having interactive transaction data and transaction identification data. The processor also correlates received transaction return data with at least said transaction identification data and calculates summary data therefrom. A first transmitter transmits the transaction to terminal apparatus, and a first receiver receives transaction return data from terminal apparatus. A video signal source transmits a video signal to the terminal apparatus. The terminal apparatus, which is coupled to the first transmitter and the video signal source, receives the video signal and the transaction identification data. The terminal apparatus particularly comprises data input circuitry for receiving transaction return data, terminal memory for storing the transaction return data associated with the transaction identification data, a terminal controller, coupled to the data input circuitry and the memory, and a data return transmitter for returning the associated transaction return data and the transaction identification data to the first receiver of the system network controller. The terminal controller determines completion of entry of transaction return data for a particularly identified transaction and, immediately after data entry completion, initiates return by the data return transmitter.

43 Claims, 13 Drawing Sheets

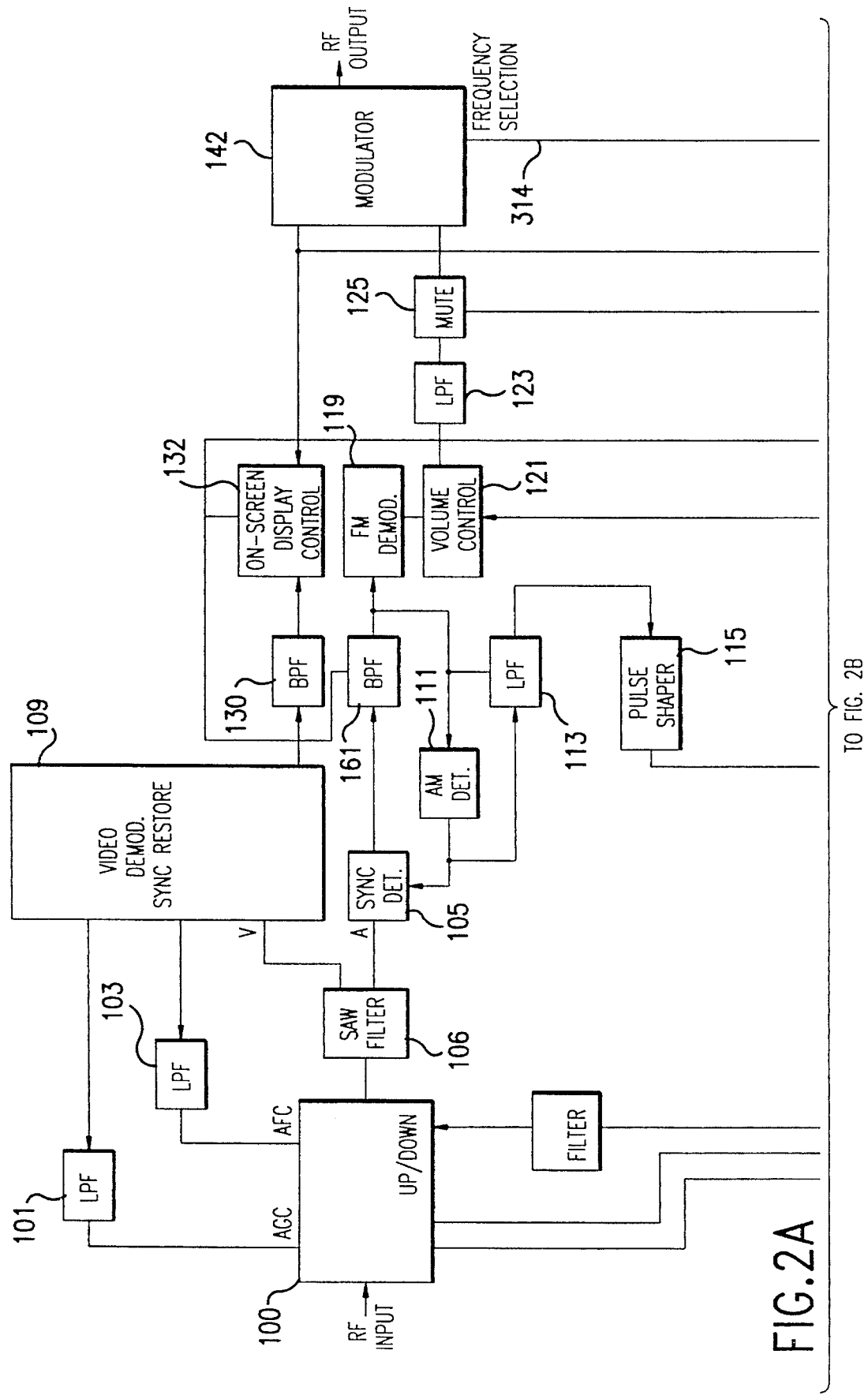

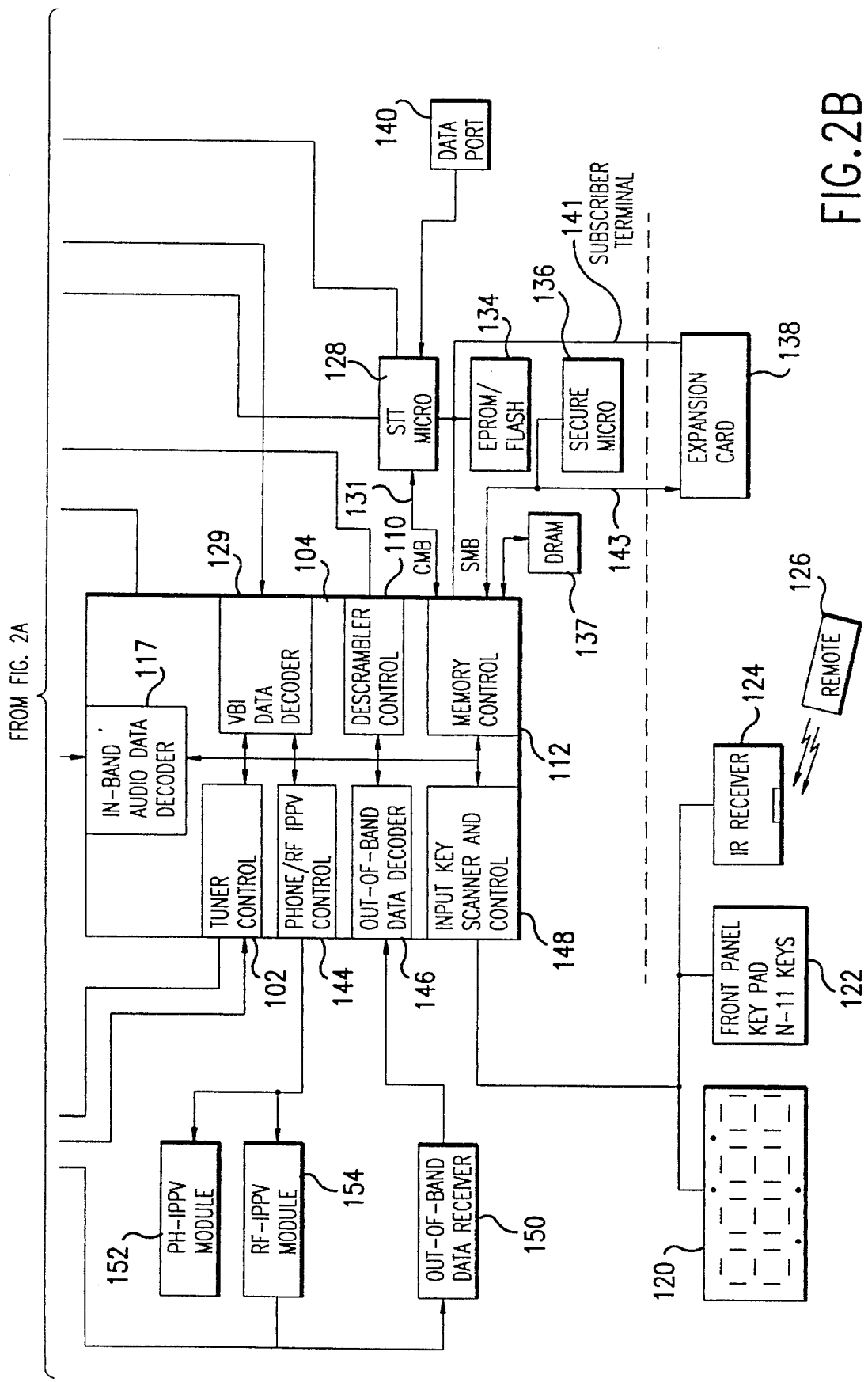

TOWN OF NEW CARROLLTON

THE TOWN COUNCIL OF NEW CARROLLTON IS CURRENTLY DEBATING WHETHER TO RAISE PROPERTY TAXES TO FUND PUBLIC HIGH SCHOOL EDUCATION

DO YOU SUPPORT RAISING PROPERTY TAXES FROM THE CURRENT RATE OF 1.0% TO 1.5% TO FUND PUBLIC HIGH SCHOOL EDUCATION IN THE TOWN OF NEW CARROLLTON?

<u>NO</u>
YES

USE ↑↓ TO UNDERLINE YOUR CHOICE, THEN PRESS [SELECT].

PRESS [MENU] TO EXIT.

FIG.3A

TOWN OF NEW CARROLLTON

RESPONSE FROM PARTICIPATING VIEWERS WHEN ASKED WHETHER THEY SUPPORT RAISING PROPERTY TAXES FROM THE CURRENT RATE OF 1.0% TO 1.5% TO FUND PUBLIC HIGH SCHOOL EDUCATION IN THE TOWN OF NEW CARROLLTON?

| ANSWER | RESPONSE |
|--------|----------|
| NO     | 44%      |
| YES    | 56%      |

FIG.3B

```
              NICKELODEON'S
              TRIVIA QUIZ !!

SUBJECT:      PRESIDENT
QUESTION:     WHEN WAS THOMAS JEFFERSON BORN?

MM  DD  YYYY
              XX/ XX/ XXXX

USE THE NUMBER KEYS TO ENTER THE ANSWER THEN
PRESS [SELECT].

PRESS [MENU] TO EXIT.
```

FIG.3C

```
              CNN PRESIDENTIAL POLL

IF THE ELECTION WERE TODAY, WHO WOULD YOU VOTE FOR?

BUSH

CLINTON

PEROT

USE ↕ TO HIGHLIGHT YOUR CHOICE, THEN PRESS [SELECT].

PRESS [MENU] TO EXIT.
```

FIG.3D

```
                    NFL FOOTBALL

GAME:           BILLS V. GIANTS
QUARTER:        1            TIME REMAINING: 2:56
POSSESSION:     BILLS        DOWN: 2    BALL ON:  OWN 19

USE YOUR FOOTBALL PROWESS TO FORECAST THE NEXT PLAY

[1] = SHORT PASS TO THE LEFT SIDE(<10 YDS)
        [2] = SHORT PASS TO THE RIGHT SIDE(<10 YDS)
        [3] = LONG PASS
        [4] = RUN TO THE LEFT SIDE
        [5] = RUN UP THE MIDDLE
        [6] = RUN TO THE RIGHT SIDE
        [7] = QUARTERBACK SNEAK

USE THE NUMBER KEYS TO ENTER THE ANSWER THEN PRESS
[SELECT].

PRESS [MENU] TO EXIT.
```

FIG.3E

```
            HOME SHOPPING AT YOUR FINGER TIPS

ITEM:                 14 CT. GOLD BANGLE
PRICE:                $156
ITEMS SOLD:           112
MINUTES REMAINING:    12

ACCOUNT NUMBER:       XXXX

USE THE NUMBERS KEYS TO ENTER YOUR ACCOUNT NUMBER THEN
PRESS [SELECT].

PRESS[MENU] TO EXIT.
```

FIG.3F

```
                    FINAL JEOPARDY

CATEGORY:       POETS
QUESTION:       WHAT YEAR DID ERNEST HEMINGWAY WIN
                THE NOBEL PRIZE?

YYYY

USE THE NUMBER KEYS TO ENTER YOUR ANSWER THEN PRESS
[SELECT].

PRESS [MENU] TO EXIT.
```

FIG.3G

```
FRIDAY NIGHT MURDER MYSTERY

QUESTION:           WHO DO YOU THINK KILLED JR?
                        [1]=BUTLER, ALFRED
                        [2]=MAID, GERLADINE
                        [3]=BUSINESS PARTNER, BOBBY
                        [4]=WIFE, MARY ELLEN
                        [5]=BROTHER, JIMMY

USE THE NUMBER KEYS TO ENTER YOUR ANSWER THEN PRESS
[SELECT].

PRESS [MENU] TO EXIT.
```

FIG.3H

```
              RIVERSIDE RACE TRACK
DATE:         APRIL  14, 1994              RACE:   2
PURSE:        $7,000.00

ODDS

[1] = FELIX                  5:4
              [2] = OSCAR                  10:11
              [3] = BLINK                  6:7
              [4] = DOC                    4:5
              [5] = FLASH                  8:9
              [6] = COASTER                2:1
              [7] = DIXIE                  6:1

MONEY WAGER:          $XXX.XX

SCRATCHED:            THUNDERSTORM

USE THE NUMBER KEYS TO ENTER YOUR PICK AND MONEY WAGER
THEN PRESS [SELECT].

PRESS [MENU] TO EXIT.
```

FIG.31

```
                    VIDEO GAMES ON DEMAND
GAME:                SUPER MARIO BROTHERS
DATE:                 APRIL 14, 1994
YOUR SCORE:              49,676
              CURRENT TOP 5 HIGH SCORES
              ─────────────────────────
            [1]   55,090      JENNY      3/22/94
            [2]   48,077      MARK       1/28/94
            [3]   47,995      JUNIOR     2/12/94
            [4]   47,882      MARY       1/15/94
            [5]   46,322      ABBY       3/17/94

GREAT JOB! YOUR SCORE IS WITHIN THE TOP 5.
ENTER YOUR NAME BELOW:
                  XXXXXXX
USE THE ← → KEYS TO MOVE BETWEEN FIELDS. SPELL YOUR
NAME BY CHOOSING THE CHARACTER IN EACH FIELD USING THE
  ↑ ↓ KEYS. THEN PRESS [SELECT]. PRESS [MENU] TO EXIT.
```

FIG.3J

```
         BALTIMORE GAS & ELECTRIC INTERACTIVE
              ENERGY MANAGEMENT PROGRAM

CURRENT SETTINGS
      TEMP:                      65
      TIME ON  (1):              6:00AM
      TIME OFF (1):              8:45AM
      TIME ON  (2):              5:00PM
      TIME OFF (2):              11:00PM

USE ↕ ← → AND NUMBER KEYS TO ENTER YOUR SELECTIONS,
THEN PRESS [SELECT].

PRESS[MENU] TO EXIT.
```

FIG.3K

```
                   BURGLAR/FIRE ALARM

CURRENT SETTINGS
      BURGLAR ALARM:             ON
      FIRE ALARM:                ON

USE ↕ ← → TO ENTER YOUR SELECTIONS, THEN PRESS [SELECT].

PRESS[MENU] TO EXIT.
```

FIG.3L

SYSTEM AND METHOD FOR SUBSCRIBER INTERACTIVITY IN A TELEVISION SYSTEM

CROSS REFERENCE TO RELATED APPLICATIONS

This application is a continuation-in-part application of, firstly, U.S. application Ser. No. 08/220,626, filed Mar. 28, 1994, now U.S. Pat. No. 5,440,632, which is a continuation of U.S. application Ser. No. 07/983,909, filed Dec. 2, 1992, now abandoned, and secondly, this application is a continuation-in-part of U.S. application Ser. No. 07/983,910 filed Dec. 2, 1992, now U.S. Pat. No. 5,367,571, and is related in subject matter to U.S. application Ser. No. 08,229,805 entitled "Subscription Television System and Terminal for Enabling Simultaneous Display of Multiple Services" and Ser. No. 08/230,144 entitled "Per-Per-View Electronic Programming Guide," filed concurrently herewith.

TECHNICAL FIELD

This invention relates to the field of subscription television systems and, more particularly, to a system and method for providing interactive services in such systems.

BACKGROUND OF THE INVENTION

In the late 1970's, the American Telephone and Telegraph Company, among others, participated in a number of trials of interactive telecommunications services between subscribers, equipped with special videotext terminals. Each terminal included display apparatus and telecommunications apparatus for permitting the trial of a number of such services where money was charged a subscriber and the desirability and economic advantages of the services studied. One problem facing the continued efficacy of such services was the limited amount of bandwidth allocated to standard voice-grade telecommunications lines. The more popular services that were trialed included, for example, the playing of games. However, because of the bandwidth limitations, the complexities of the games trialed were severely limited and resulted in subscribers becoming dissatisfied with the games offered. Consequently, the trials have been subsequently criticized in the press as technology and not market driven. There has been expressed the concern that the market data realized from those early trials was inaccurate and the trials themselves perceived to be failures.

Perhaps the longest-lived and most successful progeny of those trials have been the so-called bulletin board services. These bulletin board services-have grown in popularity as the personal computer population has grown. However, it is now perceived that these more narrow bandwidth services, such as bulletin board services, are but one of many services that can be offered through larger bandwidth facilities available in the near technical horizon. Coaxial cable bandwidth for cable television services now reaches, if not exceeds, one giga-Hertz or hundreds of 6 mega-Hertz cable television channels. Moreover, with the advent of video and audio compression, data compression and the decreasing expense of memories, the interactive information services boundaries are only limited by the imagination.

Besides interactive gaming and bulletin boards trialed in the 1970's, there were trials of burglar alarm services, home energy management services, travel reservations services, news information services and home shopping services to name but a few of the limited bandwidth services trialed. Certainly, the home shopping services were bandwidth limited to primarily limited text or graphical depictions of items offered. On the other hand, with the advent of home shopping television channels, the advantages of wide bandwidth facilities to demonstrate the products or services offered have been proven. Television has become a highly advantageous delivery system.

In the art of cable television systems, what previously has been characterized as a set top terminal with limited tuner and descrambling capabilities is soon becoming a home communications terminal including user friendly, processor controlled on screen displays for offering such services as advance video cassette recorder programming, sleep timing, parental control, pay-per-view, favorite channels and some limited messaging capabilities.

Moreover, with the advent of so-called impulse pay-per-view services, a cable television subscriber now has the opportunity to presubscribe to future pay events, the charge reporting being accomplished utilizing telephone or cable return lines. Exemplary of the art of telephone return are phone processing systems described by U.S. Pat. Nos. 5,003,384, 5,157,716 and 5,270,809, incorporated herein by reference as to any material deemed essential to an understanding of the present invention. Data return technology for a data return channel over the television cable, be it coaxial or optical, are described by U.S. Pat. Nos. 5,142,690, 5,155,590, and 5,225,902, likewise incorporated by reference.

Also, on-screen display technology for cable television terminals has progressed significantly over the years since the 1970's. For example, Scientific-Atlanta Inc. of Atlanta, Ga. first designed and implemented a cable television system for hotel or institutional situations having on screen display control features. U.S. Pat. Nos. 4,991,011, 4,994,908, 5,053,883 and 5,077,607 and pending application Ser. No. 07/960,261 filed Oct. 13, 1992 describe the downloading of screen command data from a headend to a terminal, the selective choice of audio and overlay of text data on video or plain colored background at a terminal, and real time of day on screen display. In the satellite art, Scientific-Atlanta also pioneered the transmission of a template to subscribers where subscriber supplied data may be entered to complete the template as described by U.S. Pat. No. 4,885,775. Other pending applications of Scientific-Atlanta related to on screen display control include Ser. Nos. 08/072,291 and 08/073,404 filed Jun. 7, 1993 directed to a subscriber terminal permitting reprogramming of display information and attributes thereof from a headend of the described cable television system.

Finally, U.S. Pat. Nos. 4,890,321 and 5,247,364 and pending U.S. patent application Ser. No. 07/983,766 filed Dec. 1, 1992, describe various so-called in-band and out-of-band means for transmitting data and commands from a headend to subscriber terminals. For example, by in-band is meant the transmission of data within the video television channel comprising both audio and video carriers. The data may be transmitted as amplitude modulation of the audio carrier, hereinafter in-band audio data, or in the video signal during unused portions thereof such as data channels of an M.P.E.G. compressed video data stream or the vertical or horizontal blanking periods of an analog television signal. Coordination of in-band and out-of-band data is provided at a headend of a cable system by a headend controller ("HEC") described by U.S. Pat. No. 5,058,160.

In fact, the cable television terminal of the future will be programmed and reprogrammed from the headend of the system via external memory modules, plug-in adapted to be received by the terminal or via downloading of software updates over the cable (or fiber) as described by U.S. patent application Ser. Nos. 07/983,909 and 07/983,910 filed Dec. 1, 1992.

Despite and perhaps as a result of the need in the art to improve upon these known ways and means for providing interactive services, there has yet to have been realized a coherent solution to the technological problem of providing a single system and method for realizing the majority of interactive services possible with newly available wide bandwidth technologies. Moreover, there is an opportunity to more greatly utilize the opportunities available from the existent technologies inherent in known on screen display controllers of terminals of such systems.

SUMMARY OF THE INVENTION

The problems and limitations of the known and described systems of the background of the invention are overcome by the principles of the present invention whereby each transmitted transaction from a central source to the subscriber of a subscription television system has an associated transaction identifier uniquely associated with that transaction. Moreover, a unique series of transaction identifiers may be reserved for transactions initiated from or by the subscriber or their home communications terminal. In the case of a downloaded template screen to be completed by the user, the transaction identifier becomes a template identifier. In the event of a request for viewing statistics data, the transaction identifier may be related to the time of the collection of such data and the category of data collected such as channel number and text or electronic program guide data stream number.

The on screen display of a template requiring response is completed via remote control command. Such template display can be utilized for the implementation of educational services, for example, templates which ask questions about a recently viewed program testing the viewer's acquired knowledge. The entered data is returned over telephone or the serving cable (fiber) return channels to the program source where it is tabulated. An addressed data message can then be initiated providing personal scoring, while a globally addressed template could be displayed describing how the general population of subscriber viewers responded to the questions asked.

In that regard, the present invention has utility for voting or polling of subscribers. For example, the subscriber may be requested to express their present preference for a presidential candidate, the votes tabulated and reported to the subscribers. In the same manner as with the educational application of the present invention, the data may be returned for tabulation via the serving cable or via telephone lines.

Thus, and in accordance with the present invention, a system for providing interactive services in a subscription television system comprises a system network controller for controlling the interactive services. The system controller particularly comprises controller memory for storing subscriber terminal identification data, transaction identification data and transaction return data, a processor, coupled to said controller memory, for generating a transaction having interactive transaction data and transaction identification data. The processor also correlates received transaction return data with at least said transaction identification data and calculates summary data therefrom. A first transmitter transmits the transaction to terminal apparatus, and a first receiver receives transaction return data from terminal apparatus. A video signal source transmits a video signal to the terminal apparatus. The terminal apparatus, which is coupled to the first transmitter and the video signal source, receives the video signal and the transaction identification data. The terminal apparatus particularly comprises data input circuitry for receiving transaction return data, terminal memory for storing the transaction return data associated with the transaction identification data, a terminal controller, coupled to the data input circuitry and the memory, and a data return transmitter for returning the associated transaction return data and the transaction identification data to the first receiver of the system network controller. The terminal controller determines completion of entry of transaction return data for a particularly identified transaction and, immediately after data entry completion, initiates data return by the data return transmitter.

Moreover, a method of communicating interactive information between a central source and a subscriber terminal of a subscription television system comprises the steps of downloading template screen data along with a template identifier from the central source to the subscriber terminal, storing the template screen data and the template identifier in an interactive buffer within the subscriber terminal, selectively generating on-screen character and graphics displays in place of or overlaid on the composite video signal according to the template screen data stored in the interactive buffer, determining that a viewer has completed entry of data or a timeout period has expired, generating return path data according to the completed data entry, and communicating the return path data together with the transaction identifier to the central source via a return path communication link.

Other features of the system and method of the present invention will become apparent from the following detailed description thereof.

BRIEF DESCRIPTION OF THE DRAWINGS

FIG. 2 is a detailed block diagram of one of the interactive subscriber terminals 14 shown in FIG. 1.

FIGS. 3A, 3B, 3C, 3D, 3E, 3F, 3G, 3H, 3I, 3J, 3K, and 3L illustrate examples of template screens used in connection with the interactive processes of the present invention.

DETAILED DESCRIPTION OF THE PREFERRED EMBODIMENTS

Figure 1:
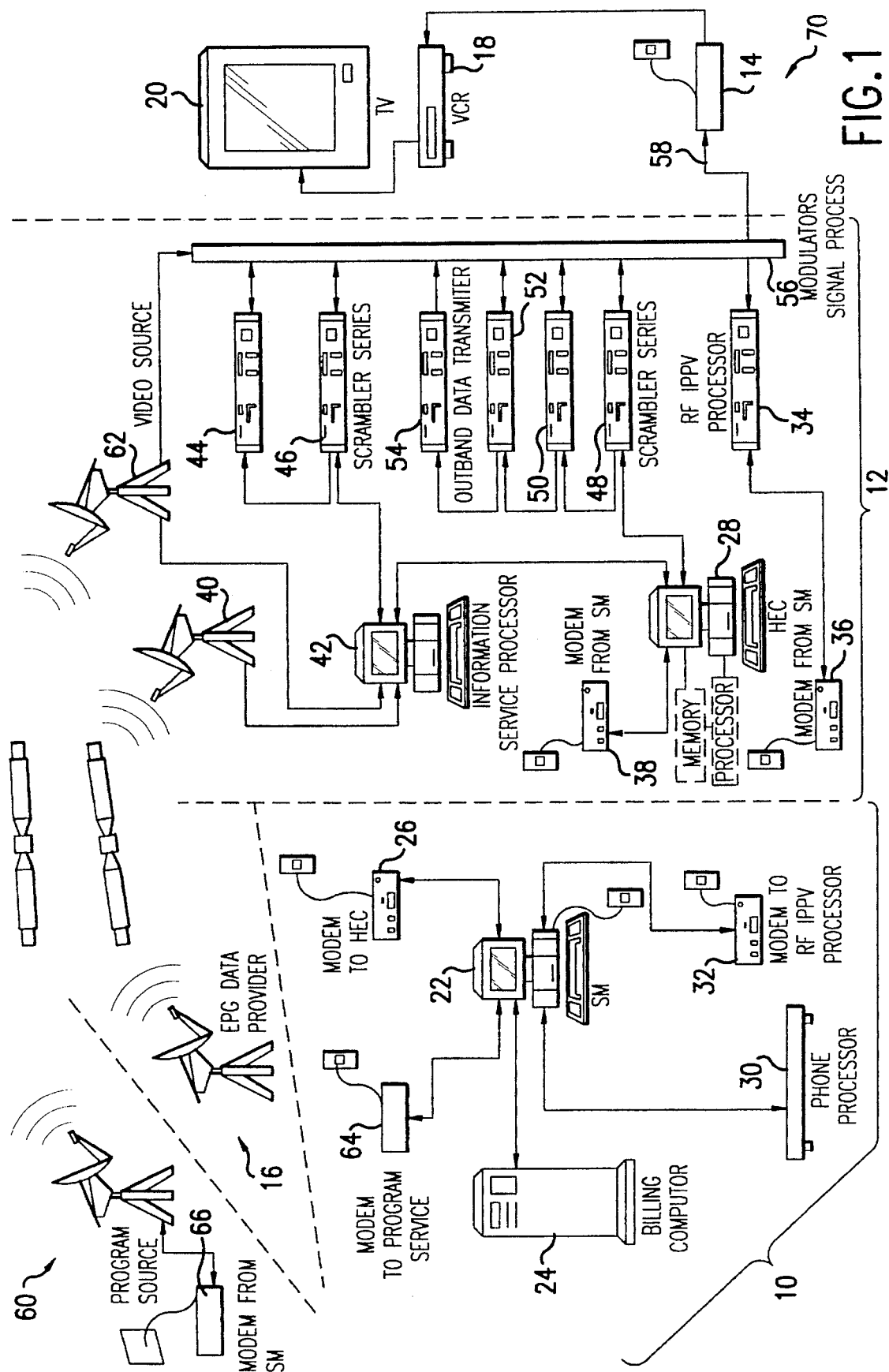
FIG. 1 is a detailed block schematic diagram of an interactive subscription television system according to the present invention.

FIG. 1 is a detailed diagram of an interactive subscription television system according to the instant invention. The system of FIG. 1 is intended to serve as an example and should not be construed as limiting the invention. A central control center 10 orchestrates the operation of the subscription television system. Central control center 10 is often associated with the central office of a multi-service operator and may communicate with and control multiple headends, such as headend 12. Headend 12 provides a subscription television service to a local area, for example, a city or a group of cities, or towns.

A subscriber terminal 14 is also shown and may be located in a subscriber's home or business location 70. Subscriber terminal 14 is coupled to video cassette recorder (VCR) 18 and television 20. It should be clear that the subscriber terminal 14 can also be coupled directly to the television 20 (not shown). Information may be communicated between central control center 10 and headend 12 by any known means including telephone networks, satellite transmissions, optical fibers, coaxial cable, other transmission lines, telecommunication apparatus, etc. or any combination of known means. Headend 12 may be coupled to subscriber terminals 14 of a plurality if subscribers via a subscription television distribution system 58, for example coaxial cables, satellite, optical fibers, telecommunication apparatus, or other known means or combinations of known means.

Central control center 10 includes a system manager 22 that directs the other components of central control center 10. System manager 22 is a PC/based computer system having a processor and memory for providing a graphical user interface that allows an operator to generate addressable control transactions that are downloaded to the subscriber terminals 14 of the subscription television service. The addressable control transactions may be directed to terminal operation, pay-per view, and messages. The addressable control transactions may also include menu screens and interactive template screens, according to the present invention. System manager 22 preferably comprises a Scientific-Atlanta System Manager 10 Network Controller.

Using the graphical interface of the system manager 22, the operator may construct an interactive template screen or menu screen and command that the screen be downloaded to subscriber terminals 14 of the subscription television service on a global, group, or individual basis. Upon receiving the download command, the system manager 22 generates a transaction containing screen data along with a screen identifier to the subscriber terminals 14. For interactive services, the system includes a return path communication link between the subscriber terminals 14 and the system manager 22. Typically, as shown in FIG. 1, headend 12 includes an RF IPPV processor 34 for receiving return path information transmitted from an RF-IPPV module within the subscriber terminal 14, and a modem 36 that retransmits the return path data from the RF IPPV processor 34 to the system manager 22 via modem 32, and the central control center 10 includes a phone processor 30 for receiving return path information directly from a telephone type IPPV module within subscriber terminal 14.

The system manager 22 communicates to headend controller ("HEC") 28 of the headend 12, for example, via modems 26 and 38. Data transmissions between the system manager 22 and HEC 28 may follow the RS-232C communication protocol but are not limited in this respect. For example, authorization data may be transmitted from system manager 22 to HEC 28. HEC 28 formats the authorization data and transmits it to subscriber terminals either in-band through scramblers 48, 50 or 52 or out-of-band through outband data transmitter 54. HEC 28 is preferably a Scientific-Atlanta Model 8658 headend controller.

Central control center 10 may also, for example, provide billing services for the services provider, including billing for pay-per-view events. A billing computer 24 stores billing data and may also format and print bills.

An electronic programming guide (EPG) data provider 16 supplies television schedule data to headend 12 via satellite receiver 40 or by other known means such as, but not limited to, cable, optical fiber, and telecommunications. This data includes program information arranged by time and channel. One such service is offered by Insight Telecast Inc. The Insight service provides extensive television program listings. Cable operators can purchase this data and provide it to their subscribers.

The EPG data received by satellite receiver 40 is passed to information service processor ("ISP") 42. The transmission of EPG data from satellite receiver 40 to ISP 42 may follow the RS-232C communication protocol but is not limited in this respect. ISP 42 may also receive text data for transmission to subscribers. The text data may include weather information, sports scores, messages, etc. and may be provided by an information service provider, or accumulated or generated by the system operator. ISP 42 is responsible for receiving the EPG data, as well as the other data, and transmitting it to the subscribers. ISP 42 provides data to scramblers 44 and 46. The transmission of data from ISP 42 to scramblers 44 and 46 may follow the RS-485 communication protocol but is not limited in this respect. Of course, the actual number of scramblers to which the ISP provides data may depend on the amount of data to be transmitted, the number of channels on which the data is to be transmitted, and the frequency at which one wishes to supply the data to the subscriber terminal. The two scramblers 44 and 46 in FIG. 2 are for example only. Scramblers 44 and 46 place data in-band for transmission to subscribers, along with scrambling an associated television signal. The EPG data and text data in a preferred embodiment are placed in the vertical blanking interval, for example, the data may be placed anywhere in the 6 mega-Hertz channel of an NTSC television signal except at lines 4, 5, and 6, and the vertical sync pulse. For example, the data could be placed on the sound carrier. Moreover, the data could be transmitted in a separate out-of-band channel (not shown). While an NTSC (U.S. standard) television signal is described by way of example in this description, the signal may be a PAL, SECAM, a digital video compressed signal, or a high definition signal having a wider bandwidth. Additional information concerning ways to transmit the data may be obtained from U.S. patent application Ser. No. 07/983,766, entitled "In-Band/Out-of-Band Data Transmission Method and Apparatus for a Television System", filed Dec. 1, 1992 and incorporated herein by reference.

The EPG data received by satellite receiver 40 will often be very extensive, containing data for programs up to one or two weeks in advance. If all this data is to be transmitted to subscriber terminal 14, the terminal must be able to store the data in its memory. To store that much information requires a significant amount of memory which would greatly increase terminal costs. Thus, ISP 42 can select portions of the data to be transmitted to subscribers. ISP 42 receives the EPG data, selects the portion to be transmitted to subscribers and passes that portion to a scrambler, e.g. scrambler 44 and/or 46. Not only may ISP 42 select portions of the EPG data, but it may also add data on local stations not covered by EPG data provider 16. ISP 42 may also reformat the data in such a way as to make it more pleasing to the subscribers.

The EPG data is most conveniently tagged as short term or long term, for example, to scramblers 44, 46. Scramblers 44, 46 send more immediate data, for example, the next several hours of EPG data, more frequently (at a higher repetition rate) than long term data. For this purpose, scramblers 44, and 46 are provided dynamic random access memory, for example, at 356 kbytes, 512 kbytes, or even 1 megabyte for temporary storage of data for transmission.

As discussed above, ISP 42 may also obtain text data from an information service provider, such as a stock quote service, or generate text data locally. The text data may originate from many different information service providers and arrive at the ISP 42 via many different media, including satellite, dial up modem, direct connect modem, direct connect to the system manager 10, or by other known means. The text data may either be transmitted as received or may be reformatted by ISP 42, then transmitted to a scrambler (44 or 46) for transmission to subscribers as described above.

A plurality of program sources, one of which is shown as program source 60, supplies television signals to headend 12 via satellite receiver 62 as shown, or by other means such as local broadcast, microwave, coaxial cable, optical fibers, telecommunication apparatus, etc. or a combination thereof. ISP 42 passes data to HEC 28, which controls scramblers 48, 50 and 52, and also outband data transmitter 54. The transmission of data from ISP 42 to HEC 28 may follow the RS-232C communication protocol, but is not limited in this respect. The transmission of data from HEC 28 to scramblers 48, 50 and 52, and outband data transmitter 54 may follow the RS-485 communication protocol, but is not limited in this respect. The scramblers 48, 50 and 52 scramble television signals and may also insert in-band data. Moreover, like scramblers 44 and 46, scramblers 48, 50, and 52 may contain dynamic random access memory for temporary storage of data for transmission. Scramblers 44, 46, 48, 50, and 52 may be Scientific-Atlanta Model 8656-SSU/SEU scramblers. Also data may be transmitted on non-scrambled channels via a data repeater (not shown) such as a Scientific-Atlanta Model 8556-100 data repeater.

The outband data transmitter 54 transmits data on a separate carrier, i.e., not within a 6 mega-Hertz channel, for example, at 108.7 MHZ. Outband transmitter 54 may be a Scientific-Atlanta Model 8653-SU addressable transmitter for transmitting global, group, or specifically addressed subscriber transactions.

The transmitted data may be, for example, descrambling information. In a preferred embodiment, data is inserted in each vertical blanking interval to indicate the type of scrambling employed in the next video field. Further, authorization information could be transmitted; this information would authorize the reception of channels or programs globally, or to specific groups or individual subscribers. Some of the information transmitted would be global, i.e., every subscriber would get it. For example, the descrambling information could be a global transmission. Note that just because each subscriber receives the descrambling information does not mean that each subscriber terminal can descramble the received signal. Rather, only authorized subscriber terminals would actually be capable of descrambling a received signal.

On the other hand, data transmissions may be addressed transmissions. Authorization data would normally be addressed to individual subscribers. That is, when transmitted, the data will have an address (for example, a subscriber terminal serial number, a group identifier or a global address) associated with it. The subscriber terminal addressed will receive the data and respond accordingly. Non-addressed subscriber terminals will ignore the data. The outputs of scramblers 44, 46, 48, 50, 52 and outband data transmitter 54 are passed to any necessary processing equipment, such as signal processors, modulators and combiners. These elements are generally indicated as block 56 and do not form a part of the instant invention. The distribution system 58 leads to a subscriber location 70.

At the subscriber location 70, terminal 14 is found. In FIG. 1, for example only, one subscriber terminal is shown. Typically, at a given location only one terminal will be found. However, two terminals may be used in the same system as discussed in greater detail below, for example, to accommodate several televisions 20. At the subscriber location, subscriber terminal 14 is connected to the subscriber's video equipment, including, for example, a VCR 18 and television 20, for example, in one room.

Referring to FIG. 2, a detailed block diagram of one of the subscriber terminals will now be described. The broadband television signal which may comprise hundreds of television channels is received from the signal distribution system 58 and input to the up/down converter or tuner 100. To provide picture-in-picture, or watch/record features, multiple tuners 100 (not shown) may be provided for tuning more than one television channel simultaneously. An out-of-band data receiver 150 is also coupled to the broadband input for receiving data transactions from outband data transmitter 54. Conventionally, the up/down converter 100 may include an input filter, such as a diplexer, to separate the out-of-band signal and the broadband television signal. The up/down converter 100 can be tuned to a predetermined data-carrying channel for receiving in-band video and audio data when not used by the subscriber for recording or viewing a selected television channel. The channel may be predetermined from the system manager 22 and, by one of the data transmission methods described herein. The predetermined data-carrying channel identification can be pre-stored or downloaded and stored in the subscriber terminal 14.

When in use, the up/down converter 100 is tuned according to a channel selected by a subscriber via a user interface having an infrared (IR) receiver 124, remote control 126 or via terminal keypad 122. Up/down converter 100 uses a phase locked loop under the control of a tuning control 102 to convert the selected or predetermined default RF channel signal to an intermediate frequency signal, for example 45.75 mega-Hertz. A multifunction control circuit (MCC) 104 is linked to up/down converter 100 by a bidirectional link to the tuner control 102. The MCC 104 is preferably an application specific integrated circuit (ASIC) combining many subscriber terminal control and data handling functions into a single package. Of course, the ASIC may include any combination of individual control circuits. Alternatively or in addition, other control circuitry may be used, for example a microprocessor.

The bidirectional link may include one path for tuning and a return path for feedback control of the tuning process. A feedback signal for automatic gain control and one for automatic frequency control are transmitted to the up/down converter 100 through filters 101, 103, respectively from a video demodulator 109.

A filter, for example a SAW filter 106, filters the IF channel signal to split the signal into separate video and audio portions for processing. The video portion is demodulated and descrambled by the video demodulator and descrambler 109 under the control of the descrambler control 110 of the MCC 104. For example, the video demodulator and descrambler 109 may perform sync restoration (one form of descrambling of the video signal) for sync suppression scrambling. The video signal then passes through a bandpass filter 130 to an on-screen display control 132 where inverse video inversion (a second form of descrambling) takes place, if necessary. The descrambling of the video portion, whether sync suppression, sync inversion, video line inversion, etc., is under the control of the descrambler control 110 of the MCC 104. The descrambler control 110 provides the necessary timing signals, inversion axis levels, and whether the video is inverted or not to the on-screen display control 132 and supplies the necessary timing, restoration levels, and identification sync pulses to be restored to the video demodulator and descrambler 109. The descrambler control 110 receives such descrambling information either from pulses as in-band audio data, from data modulated on the video during the vertical blanking interval, or via out-of-band means.

In the other path, the audio signal is converted from the IF carrier to an intermodulation frequency, for example 4.5 megaHertz, by a synchronous detector 105. Feedback for automatic gain control of detector 105 is supplied from the output of bandpass filter 161. The audio signal may then be demodulated by an FM demodulator 119. An amplitude modulation detector 111 performs pulse detection to recover the in-band audio data which are amplitude modulated onto the audio carrier. The received in-band pulses are supplied to an in-band audio data decoder 117 of MCC 104 for processing after being shaped by pulse shaper 115. The in-band data, except for descrambling data, is stored in DRAM 137 for buffering. Descrambler control 110 accesses descrambling data directly for the video descrambling operation.

Volume control of the audio signal is performed under control of a volume control 41 and the microprocessor 128 as described in U.S. Pat. No. 5,054,071, incorporated herein by reference. After volume control, the audio signal is passed through a low pass filter 123 and a mute switch 125. The output of the mute switch 125 is applied to a modulator 142.

The MCC 104 receives the video signal after demodulation and descrambling and detects the in-band video data from the VBI of the signal with a VBI detector. The in-band video data is transmitted at a frequency on the order of known teletext systems, such as 4.0 megabits per second. However, the invention should not be considered limited in this respect. A data clock provides an appropriate sampling frequency higher than the Nyquist rate according to well known techniques. The VBI data decoder 129 stores the data in DRAM 137 prior to processing by the microprocessor.

The on-screen display control 132 selectively generates on-screen character and graphics displays in place of or overlaid on the video signal. For example, the information stored in DRAM 137 by the VBI data decoder 129 may be read out to the on-screen display control and used to generate on-screen characters and/or graphics. The modulator 142 combines the video signal from the output of the on-screen display control 132 and the audio signal from the output of the mute control circuit 125 and converts the combined signal to the channel frequency selected by the microprocessor 128, such as channel 3/4 for NTSC. The combined and remodulated signal is supplied as an RF output to a television receiver in a well known manner.

A control microprocessor 128 controls the overall operation of the subscriber terminal 14. The subscriber terminal communicates to and controls the microprocessor 128 through interactive user interface with an on-screen display. The user interface includes keyboard 122 on the front panel of the subscriber terminal 14 and the remote control 126 which generates subscriber control signals for channel tuning, volume level control, feature selection, and the like. These subscriber commands are decoded by an input scanner and control 148 of the MCC 104. The remote IR receiver 124 of the user interface receives the commands from the IR or other remote control 126, as is well known in the art, and provides commands to the microprocessor 128. The user interface may additionally include a display 120, for example, a four-digit, seven segment LED display, which displays the tuned channel numbers and diagnostics. The microprocessor 128 also includes an accurate real time of day clock that is periodically refreshed by the headend 12 by globally addressed commands, for example, in accordance with U.S. Pat. No. 4,994,908, which teaches the display of time of day in a CATV system.

When the keypad 122 or remote control 126 is utilized to select a command, the microprocessor 128 operates to execute the command. The subscriber terminal interacts with the subscriber by providing numerous on-screen displays which assist in the operation of the terminal. The on-screen displays provide information and prompts to guide the subscriber through many of the complex features of the terminal. For example, the on-screen display may implement a menu page structure for providing screen-by-screen directions for using the subscriber terminal and its features.

The descrambler control 110 of the MCC 104 utilizes recovered descrambling data to generate appropriate control signals, for example, inversion control and equalizing, sync restoration or regeneration for descrambling, or otherwise restoring the input baseband television signal. A secure microprocessor 136 determines whether the descrambler control 110 of the MCC 104 carries out descrambling on a particular channel or what form of descrambling is required at a particular time by interpreting the authorization and control data downloaded from the system manager 22 (by any of the three data transmission schemes discussed herein, out-of-band, in-band audio or in-band video) into the internal non-volatile memory (NVM) of the device. The NVM in the secure microprocessor 136 stores secure data, for example, authorization data, scrambled channel data, some terminal configuration data and other required data.

The control processor 128 operates by running a control program which preferably is partially stored in a read-only memory internal to the processor and partially stored in an NVM, such as Flash EPROM memory 134. In addition, the control program of the microprocessor 128 may also reside in the NVM of an expansion card 138. The microprocessor 128 communicates with the NVM 134, 138 via a memory bus 141 which has data, address, and control lines. The microprocessor 128 also controls the data decoders 117, 129 and 146, volume control 41, on-screen display control 132, and the tuner control 102, descrambler control 110 and input key scanner and control 148 via commands through MCC 104 and control processor bus (CMB) 131. The microprocessor 128 directly controls the mute switch 125 and the output frequency selection of the modulator 142. The microprocessor 128 includes additional capacity for other auxiliary device communications and control through a data port 140. For example, the data port may accommodate an IR blaster for VCR control via an on-screen menu, an additional subscriber terminal for dual tuner operation, or connection to a digital video subscriber terminal.

The subscriber terminal 14 may receive addressable and global data, other text data, and descrambler data transmitted from the headend 12 via the in-band vertical blanking interval (VBI). Alternatively or in addition, addressable and global data may be transmitted in a separate out-of-band data carrier if an out-of-band receiver is provided. The memory control 112 permits data coming from the three data decoders 117, 129, and 146 to be placed in a volatile memory, for example DRAM 137. There it can be accessed by the control microprocessor 128 via the CMB 131. Additional details are discussed below. The MCC 104 also distributes control instructions from the control microprocessor 128 to other parts of the MCC 104 to provide operation of the rest of subscriber terminal 14. The MCC 104 additionally connects to a secure microprocessor bus (SMB) 143 which permits communications between the secure microprocessor 136 and other portions of the subscriber terminal 14. The SMB 143 is further coupled to the expansion card 138 to provide renewable security.

The memory control 112 and microprocessor interfaces of the MCC 104 are the central communications facility for the control microprocessor 128 and the secure microprocessor 136. The memory control 112 receives requests from the microprocessors 128, 136 and other controls and data decoders to write to memory or read from memory. It resolves contentions for memory transfers, giving priority to real time applications and the microprocessors, and schedules the data flow. The microprocessors 128, 136 communicate through internal registers of the MCC 104 with the memory control 112 and other portions of the MCC 104.

The expansion card 138 may be a printed card which contains memory and/or secure microprocessor components, which can be plugged into a connector 200. The connector 200 can be configured such that, when it receives the expansion card 138, the expansion card is flush with top cover. The connector 200 electrically extends the control microprocessor memory bus 141 and the secure microprocessor bus 143 to the expansion card 138. Additional program or data memory, renewed security, or any other application supported by microprocessors 128, 136 can be provided by the expansion card 138. In addition, circuitry coupled to microprocessor 126 may be provided for detecting whether or not the expansion card is installed. Thus, the subscriber terminal 14 may be controlled in accordance with information contained on the expansion card 138 when installed and in accordance with internal software when the expansion card 138 is not installed. Additional details concerning the expansion card 138 may be obtained from U.S. patent application Ser. No. 07/983,910, entitled "Subscriber Terminal with Plug In Expansion Card", which is incorporated herein by reference.

The VBI data decoder 129 performs two main functions. The first function is to process all scrambled transactions that are sent to the subscriber terminal. Processing a transaction can includes digital filtering, error detection, error correction, decryption and storage of the data. The second function is to determine the line number and field number of the video. The line and field numbers are used by other components of the subscriber terminal, such as the descrambler control 110 and the on-screen display control 132.

The control and secure microprocessor interface 310 provides connection between the registers for the VBI decoder 129 and control microprocessor 128 and secure microprocessor 136. The control microprocessor 128 interfaces with the VBI decoder 129 to control operations thereof. The secure microprocessor 136 provides the VBI decoder 129 with information required to perform descrambling and information recognition functions. For example, the secure microprocessor 126 may provide a present encryption seed, the next encryption seed, and the subscriber terminal address. Additional details of the VBI decoder are discussed in application Ser. No. 08/229,805, entitled "Subscription Television System and Terminal For Enabling Simultaneous Display of Multiple Services", filed concurrently herewith and incorporated herein by reference.

A brief description of the on-screen display will now be provided. As noted above, the on-screen display is implemented from the on-screen display control 132. The screen may include for example 16 lines with either 45 characters per line, 24 characters per line, or a combination of both. The cubes used to display text can vary in size. In a preferred embodiment, the size of the cubes must conform to the following inequality:

$$(\text{height} \times \text{width})/2 \leq 256$$

In this case, there is a minimum of seven pixels and a maximum of thirty-two pixels for the width of the cube. There is a minimum of six pixels and a maximum of sixty-four pixels for the height of each cube. Underlining can be activated and deactivated on a per-cube basis. The background display may take, for example, any of 4096 different colors, including transparent. Characters or graphics overlayed onto active video may be surrounded by a block of black background to enable easy distinction from the video. Additional details of the on-screen display control may be obtained from U.S. patent application Ser. No. 08/073,404, entitled "Display System for Subscriber Terminal", filed Jun. 7, 1993 and which is incorporated herein by reference.

The subscriber terminal is capable of accessing a wide variety of information using text channels, EPG, interactive templates, and messages which are transmitted as data from the headend 12 to the subscriber terminal 14 in, for example, the vertical blanking interval of the video portion, modulated on the audio carrier, or via outband transmission. A further understanding of the techniques by which data may be transmitted from the headend 12 to the subscriber terminal 14 can be obtained from U.S. patent application Ser. No. 07/983,766, entitled "In-Band/Out-of-Band Data Transmission Method and Apparatus for a Television System", filed on Dec. 1, 1992 and which is incorporated herein by reference. Additional details of the techniques by which EPG data is transmitted from the headend 12 to the subscriber terminal 14 may be obtained from U.S. application Ser. No. 08/230,144, entitled "Pay-Per-View Electronic Programming Guide", filed concurrently herewith and incorporated by reference.

In a single tuner embodiment, multiple data streams may be selected by the user for display. In a two or more tuner embodiment, multiple video channels and data streams may be displayed. Moreover, multiple video channels may be combined at a headend for transmission. Additional details of displaying multiple video channels, text channels and the messaging capabilities of the subscriber terminal may be obtained from U.S. application Ser. No. (Attorney Docket No. 1263.45910), entitled "Subscription Television System and Terminal For Enabling Simultaneous Display of Multiple Services", filed concurrently herewith and incorporated herein by reference.

The subscriber terminal 14 includes an impulse-pay-per-view (IPPV) module for transmitting return path information from the subscriber terminal 14 to HEC 28 and/or to the system manager 22 of the central control center 10. The IPPV module can be one or both of the telephone type 252 and the RF-IPPV type 154. Such return path information of the RF-IPPV type may be transmitted via a coaxial cable, an optical link, or other known means.

The return path information may include billing data related to IPPV services. As described above, subscriber terminal 14 can either transmit billing data over a telephone line directly to the phone processor 30 or back up the cable to RF IPPV processor 34. If the data is sent to RF IPPV processor 34, it is sent by modem 36 associated with RF IPPV processor 34 to modem 32 associated with system manager 22. System manager 22 accumulates the billing data from phone processor 30 and modem 32 and provides it to billing computer 24 so that customers may be billed for their program services. The IPPV module also allows subscribers to request authorization of their subscriber terminal to receive pay events such as pay-per-view events or near-video-on-demand (NVOD) transactions, store the data associated with the purchase of the event in the NVM of the secure microprocessor 136, and then transmit the data to the system manager 22 via the telephone return path or the RF return path via the signal distribution system.

According to the present invention, interactive information is communicated between a central source and the subscriber terminal 14 using transactions having an associated transaction identifier uniquely associated with that transaction. The central source may, for example, be the system manager 22 of a subscription television system or a program source 60 as shown in FIG. 1. The interactive information may include a template screen downloaded from the central source to the subscriber terminal 14 to be completed by the user. Such template display can be utilized for the implementation of educational services, for example, templates which ask questions about a recently viewed program testing the viewer's acquired knowledge, or, for example, polling a viewer for a response to an election poll. In this case, the transaction identifier becomes a template identifier. The interactive information downloaded from the central source to the subscriber terminal 14 may also include a request for data accumulated by the subscriber terminal 41. The data accumulated by the subscriber terminal 14 may be related to the operation of the subscriber terminal 14, such as viewing statistic data that indicates the channel number, text data stream number, and/or electronic guide data stream number that the subscriber is tuned to at a specific time. Viewing statistic data furnishes the service providers with feedback as to the popularity of their programming choices. In this case, the transaction identifier may be related to the time of the collection of such data and the category of data collected such as channel number, text data stream number, and/or electronic program guide data stream number.

The data accumulated by the subscriber terminal 14 may be unrelated to the operation of the subscriber terminal, supplied to the subscriber terminal 14 via data port 140 from a separate data acquisition unit (not shown) within the subscriber's location 70. For example, the data acquisition unit may be a temperature control system, a humidity control system, a burglar alarm system, or a fire alarm system within the subscriber's location 70. For example, the microprocessor 128 may accumulate energy management data via data port 140. Energy management data may, for example, allow the system manager 22 to control the temperature control system at the subscriber's location 70. The central source may download to the subscriber terminal 14 a request for energy management data accumulated by the subscriber terminal 41. The transaction identifier associated with the request for energy management data may be related to the time for activating and deactivating the temperature regulating means at the subscriber's location 70 and the control temperature to be maintained during the activated state.

In a first embodiment of the present invention, interactive information is communicated between the system manager 22 and the subscriber terminal 14. To begin, an operator utilizes the graphical interface of the system manager 22 to enter interactive information which is to be communicated to subscribers of the subscription television service via the subscriber terminals 14 on a global, group, or individual basis, and to issue a download command. Upon receiving the download command, the system manager 22 generates a transaction that includes the interactive information and a unique transaction identifier, and transmits the transaction to HEC 28 via a communication link. FIG. 1 illustrates the communication link as having a telephone network and modems 32 and 38; however, the transaction can be communicated over satellite transmission, optical fibers, or other transmission lines, etc. The HEC 28 may forward the transaction to one of the scramblers 50, 52 for insertion into the vertical blanking interval of a composite video signal or for modulation on the audio carrier of the composite video signal, may forward the transaction to the outband data transmitter 54 for outband transmission, or may forward the transaction to ISP 42. ISP 42 then forwards the transaction to one of the scramblers 44, 46 for insertion into the vertical blanking interval of a composite video signal or for modulation on the audio carrier of the composite video signal.

Depending upon the transmission scheme, either the VBI data decoder 129, the in, band audio data decoder 117, or the out-of-band data decoder 146 decodes the transaction and stores transaction data, including the unique transaction identifier, in an interactive buffer which is part of DRAM 137. In the case that the interactive information includes a template screen, template screen data and a template identifier are stored in the interactive buffer. The template screen data is then read out to on-screen display control 132 to selectively generate on-screen character and graphics displays in place of or overlaid on the composite video signal. In the case that the interactive information includes, for example, a request for viewing statistic data, the time of the collection of viewing statistic data and the category of data collected such as channel number and/or text or electronic program guide data stream number is stored in the interactive buffer.

The microprocessor 128 of the subscriber terminal 14 then gathers return path data. In the case that the interactive information includes a template screen, the microprocessor 128 generates return path data according to user inputs from the keyboard 122 or the remote control 126. In the case that the interactive information includes, for example, a request for viewing statistics, the microprocessor 128 collects viewing statistic data according to the time of collection and the category of data collected stored in the interactive buffer.

The microprocessor 128 then completes the interactive communication process, immediately after data collection is complete, by initiating communication of the return path data together with the unique transaction identifier to the system manager 22 via a return path communication link. FIG. 1 illustrates the return path communication link as being a telephone network with the phone IPPV module 152 and the phone processor 30, or as being an RF return path/telephone link with RF-IPPV 154, RF IPPV processor 34, modem 36 and modem 32; however, the return path data can be communicated over satellite transmission, optical fibers, or other transmission lines, etc. The phone IPPV module 152 completes the interactive communication process by forwarding the return path data together with the unique transaction identifier to the system manager 22 via phone processor 30. The RF-IPPV module 154 completes the interactive communication process by forwarding the return path data together with the unique transaction identifier to the system manager 22 via RF IPPV Processor 34, modem 36, and modem 32. The system manager 22 may process the return path data and download a second transaction based upon the results of the first transaction.

Alternatively, communication between the system manager 22 and the subscriber terminal 14 may be reversed by initiating from the subscriber terminal 14 a transaction having a unique identifier.

Furthermore, one skilled in the art would recognize that the return path communication link to the system manager 22 as described above can be coupled to either the ISP 42 or the HEC 28, thereby providing communication of interactive information between the ISP 42 and the subscriber terminal 14, or between the HEC 28 and the subscriber terminal 14, respectively.

In a second embodiment of the present invention, interactive information is communicated between the program source 60 and the subscriber terminal 14. To begin, an operator at the program source 60 constructs an interactive transaction which is to be communicated to subscribers of the subscription television service via the subscriber terminals 14 on a global, group, or individual basis, and to issue a download command. Upon receiving the download command, the program source 60 transmits the transaction along with a unique transaction identifier to the headend 12 via a communication link. FIG. 1 illustrates the communication link between the program source 60 and the headend 12 as a satellite communication system, however, the communication link may be over optical fibers, coaxial cable, or other transmission lines, etc. The transaction may be inserted into the vertical blanking interval of a composite video signal, modulated on the audio carrier of the composite video signal, or transmitted out of band. If the format of the transaction generated by the program source cannot be recognized by the subscriber terminal 14, the satellite receiver 62 strips the transaction from the composite video signal, reformats the transaction according to the format recognizable by the subscriber terminal 14, and forwards the reformatted transaction to ISP 42. ISP 42 may forward the reformatted transaction to one of the scramblers 44, 46 for insertion into the vertical blanking interval of a composite video signal or for modulation on the audio carrier of the composite video signal, or may forward the reformatted transaction to HEC 28. HEC 28 may forward the transaction to one of the scramblers 50, 52 for insertion into the vertical blanking interval of a composite video signal or for modulation on the audio carrier of the composite video signal, or may forward the transaction to the outband data transmitter 54 for outband transmission.

As described above with respect to the first embodiment, depending upon the transmission scheme, either the VBI data decoder 129, the in-band audio data decoder 117, or the out-of-band data decoder 146 decodes the transaction and stores transaction data, including the unique transaction identifier, in an interactive buffer which is part of DRAM 137. The microprocessor 128 of the subscriber terminal 14 then gathers return path data and, immediately after data collection is complete, initiates the communication of the return path data together with the unique transaction identifier to the system manager 22 via the return path communication link. The system manager 22 then forwards the return path data together with unique transaction identifier to the program source via a second return path communication link. FIG. 1 illustrates the second return path communication link as having a telephone network and modems 64 and 66; however, the transaction can be communicated over satellite transmission, optical fibers, or other transmission lines, etc. The program source 60 may process the return path data and forward a second transaction based upon the results of the first transaction.

Alternatively, communication between the program source 66 and the subscriber terminal 14 may be reversed by initiating a transaction having a unique identifier from the subscriber terminal 14.

A system employing both the first and second embodiments of the present invention affords flexibility by providing interactive information that is both local and global in nature to the subscribers of the television system. For example, interactive information local in nature can be generated by system manager 22 and communicated to the subscriber terminals 14 of the television system according to the first embodiment. Interactive information global in nature can be generated by program source 60 and communicated to the subscriber terminals 14 of the television system according to the second embodiment.

The interactive processes of the subscriber terminal 14 as described above can selectively be turned ON and OFF from the subscriber terminal 14 or a remote control, such as remote control 126 in FIG. 2, or by addressed command from the headend 12. For example, a switch on the remote control 126 may be labeled as "Interactive TV" or the interactive processes can be activated and deactivated from a "set-up" menu provided by the subscriber terminal 14 as taught by U.S. Pat. No. 4,987,486. Furthermore, keyboard 122 on the subscriber terminal 14 may be used to activate and deactivate the interactive processes of the subscriber terminal 14.

Figure 4A:
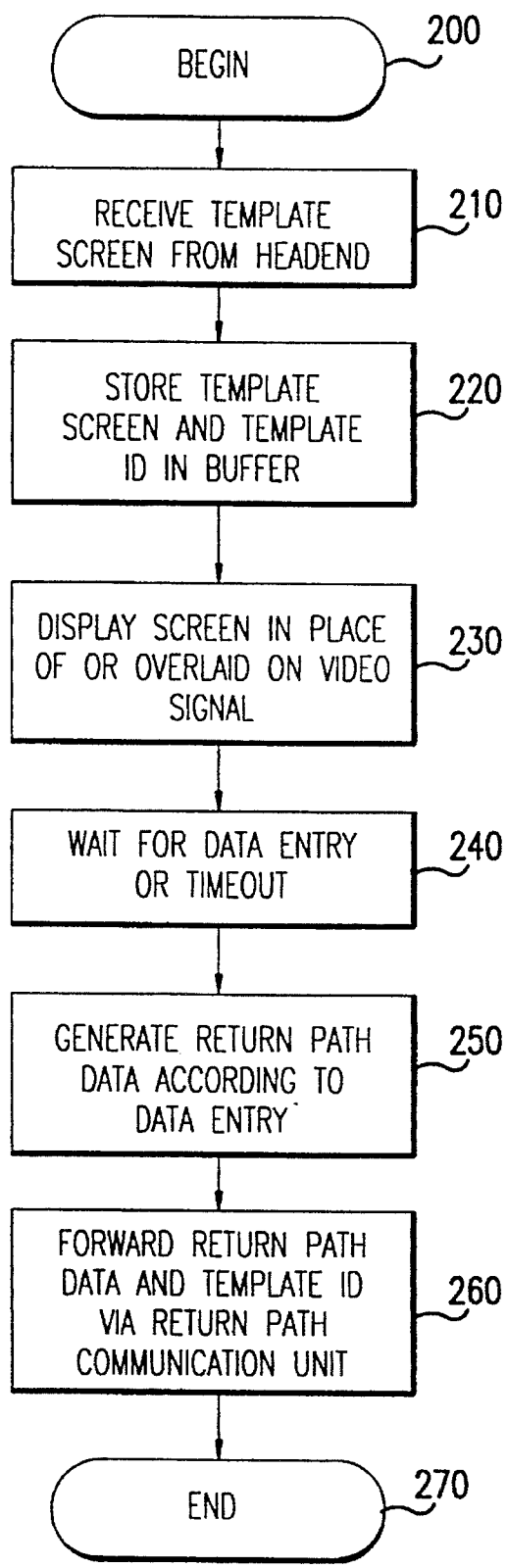
FIGS. 4A and 4B illustrate a method of communicating interactive information using the template screens of FIGS. 3A–3L.

FIGS. 3A–3L illustrate template screens used in connection with the interactive processes of the present invention. As shown in FIG. 4A, in box 210, the template screens along with a template identifier are downloaded from the central source, be it system manager 22, ISP 42 or signal source 60, and received at the subscriber terminal 14, and stored in an interactive buffer within the subscriber terminal 14 in box 220. In box 230, the template screen data is then read out to on-screen display control 132 to selectively generate on-screen character and graphics displays in place of or overlaid on the composite video signal. The template screen may include interactive fields which may be completed by the viewer or which represent choices from which the viewer can make selections. The template screen data may designate that one or more of the interactive fields is to be uniquely displayed, for example, by highlighting, underlining, or blinking the particular field. In box 240, the microprocessor 128 of the subscriber terminal 14 determines the selection made by the viewer or waits for a timeout period. If the predetermined timeout period expires before the viewer has entered data required by the screen, the microprocessor 128 returns control to the video or other tuned to channel. In box 250, if the data is complete, the microprocessor 128 generates return path data according to the selection. In box 260, the return path data together with the unique transaction identifier is communicated to the central source via a return path communication link, and the interactive process is completed.

Figure 4B:
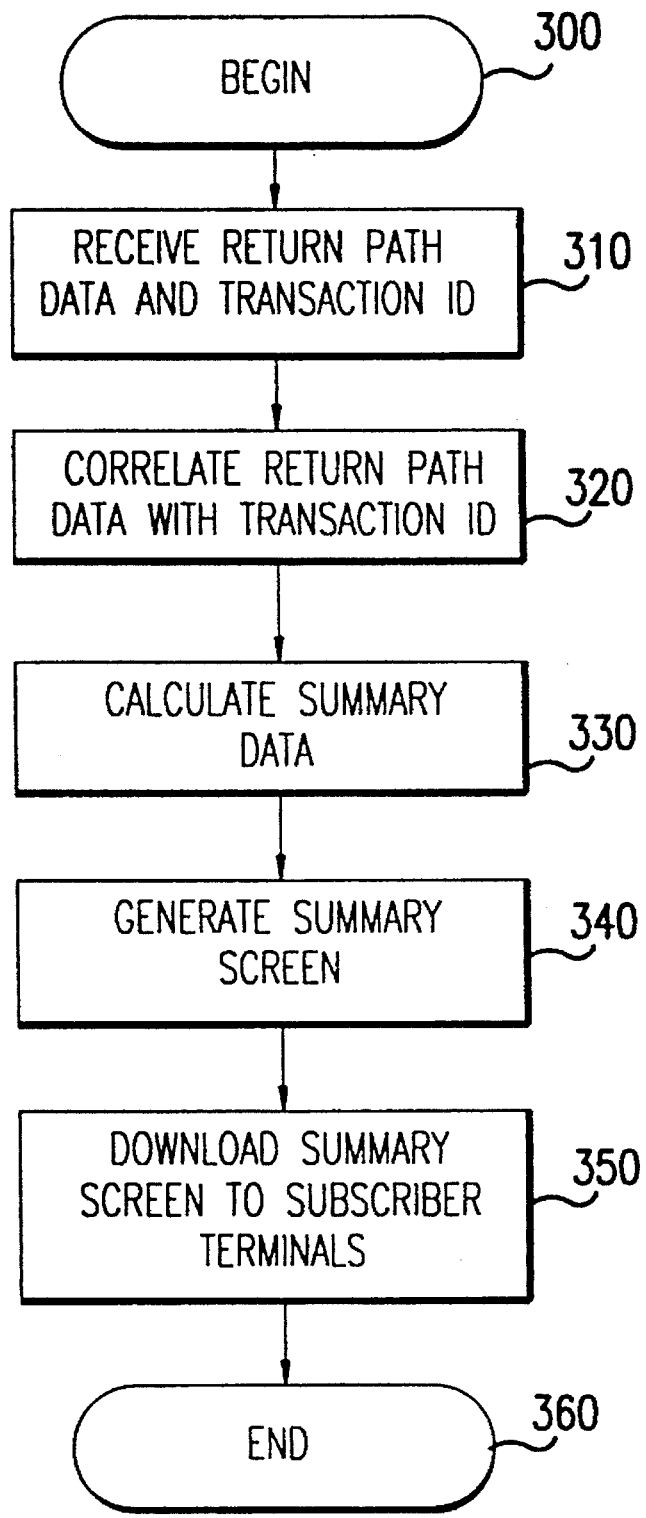

As shown in FIG. 4B, the central source, be it the system manager 22, ISP 42 or the program source 60, may process the return path data and forward a second template screen based upon the return path data received with respect to the first template screen. In box 310, the central source receives the return data and transaction identifier transmitted by the subscriber terminals 14 via the return path communication link, and correlates the return path data with the transaction identifier in box 320. In box 330, the central source calculates summary data according to the return path data received from the plurality of subscriber terminals 14. In box 340, the central source generates a summary screen according to the summary data, and downloads the summary screen to the subscriber terminals 14 in box 350.

The remote control 126 and/or the keyboard 122 may be provided with at least number keys "1" through "9" and cursor direction keys "UP", "DOWN", "LEFT" and "RIGHT" or arrows representing these directions, or similar means to accept viewer input. The current placement of the cursor may be indicated by an underline, a blinking character, a highlighted character, or other suitable means. The cursor direction keys move the cursor placement between the interactive fields. Of course, a more complete keyboard, for example, one comprising alphabetic character keys may be provided, but such a keyboard adversely affects userfriendliness.

FIG. 3A shows a template screen used in connection with the first embodiment of the present invention as described above. The template screen along with a template identifier are downloaded from the system manager 22 to the subscriber terminal 14 and displayed in place of or overlaid on the composite video signal which may represent a picture signal originating locally, for example, under the sponsorship of a municipality or public agency. As shown in FIG. 3A, the template screen polls the viewer whether he/she supports raising property taxes to fund public high school education, an issue that is local in nature. Such a screen is most conveniently generated at system manager 22 or ISP 42 and may accompany a local text news channel data stream or be a frame included in a video channel, for example, carrying live town meetings. The template screen includes interactive fields "NO" and "YES" which represent the choices from which the viewer can make a selection.

The viewer uses the cursor direction arrows to move the underline between the "NO" and "YES" interactive fields and selects the choice, for example, by pressing the [Select] button on the remote control 126.

The microprocessor 128 generates return path data according to the selection input by the viewer and communicates the return path data together with the template identifier to the system manager 22 or ISP 42 via the return path communication link.

The system manager 22 or ISP 42 may process the return path data to compute the results of the poll. As shown in FIG. 3B, the system manager 22 or the ISP 42 may be utilized to generate and download a second screen template globally to all viewers of the channel showing the results of the poll. The system manager 22 or the ISP 42 may also download a screen template to each individual subscriber who voted showing the individuals their choice (not shown), or incorporating the results into the first screen. Moreover, the results of the poll may be simultaneously forwarded to the municipality by telephone lines or video, for example, to a live "town meeting".

FIGS. 3C–3J show template screens used in connection with the second embodiment of the present invention as described above. The template screens of FIGS. 3C–3J are downloaded along with a template identifier from the program source 60 to the subscriber terminal 14, and displayed in place of or overlaid on the composite video signal.

As shown in FIG. 3C, an interactive template screen can be implemented for educational services. The template screen prompts the viewer for an answer to a trivia quiz that relates to a recently viewed program on the Nickelodeon channel, thereby testing the viewer's acquired knowledge. The template screen includes interactive fields "XX" for month, fields "XX" for day, and fields "XXXX" for the year. Each of these may blink one at a time to signal the viewer what choice to make.

The viewer uses the number keys to enter the month, day, and year of the answer and records the answer, for example, by pressing the [Select] button on the remote control 126.

The microprocessor 128 generates return path data according to the answer input by the viewer and communicates the return path data together with the template identifier to the program source 60 via the return path communication link.

The program source 60 may process the return path data to compute the results of the quiz. The program source 60 may then download a second screen template globally to all viewers of the channel showing the results of the quiz. The program source 60 may also addressably download a screen template to each individual subscriber who answered the quiz or incorporate the details into the second screen by reading and displaying terminal-stored subscriber responses.

Such a template screen may be used during a live lecture which is broadcast to subscribers of the subscription television system, providing the lecturer with the ability to periodically query viewers to determine, for example, if the majority of the viewers understand the concepts being presented. The lecturer can then fashion the lecture according the answers received.

As shown in FIG. 3D, an interactive template screen can be implemented for polling a viewer for a response to an election poll. The template screen includes interactive fields "BUSH", "CLINTON", and "PEROT", which represent the choices from which the viewer can make a selection.

The viewer uses the cursor direction arrows to move the underline between the three interactive fields "BUSH", "CLINTON", and "PEROT" and selects the choice, for example, by pressing the [Select] button on the remote control 126.

The microprocessor 128 generates return path data according to the selection input by the viewer and communicates the return path data together with the template identifier to the program source 60 via the return path communication link.

The program source 60 may process the return path data to compute the results of the poll. The program source 60 may then download a second screen template globally to all viewers of the channel showing the results of the poll. The program source 60 may also download a screen template to each individual subscriber who voted showing the individuals their choice or the terminal 14 may incorporate the details into the second screen from the stored response data.

As shown in FIG. 3E, an interactive template screen can be implemented in conjunction with sporting events to prompt the viewer for a response related thereto, for example, the strategy and outcome of the sporting event. As shown, the template screen prompts the viewer to forecast the next play of a football game by choosing from one of a plurality of plays.

The viewer uses the number keys to select the forecasted play and records the selection, for example, by pressing the [Select] button on the remote control 126.

The microprocessor 128 generates return path data according to the forecasted play selection input by the viewer and communicates the return path data together with the template identifier to the program source 60 via the return path communication link.

The program source 60 may process the return path data and correlate the results of the selections among the various participating subscribers. The program source may then download a second screen template globally to all viewers of the channel showing the results of the selections. The program source may also download a screen template to each individual subscriber who participated indicating the correct selection according to the outcome of the football game.

As shown in FIG. 3F, an interactive template screen can be implemented in conjunction a home shopping channel to prompt the viewer for a sale. As shown, the template screen displays information related to the item for sale and prompts the viewer to purchase the item by entering an account number.

The viewer uses the number keys to enter the account number and records the purchase, for example, by pressing the [Select] button on the remote control 126.

The microprocessor 128 generates return path data according to the account number entered by the viewer and communicates the return path data together with the template identifier to the program source 60 via the return path communication link.

The program source 60 may process the return path data and correlate the results of the purchases among the various participating subscribers. The program source may then download a second screen template addresses to all viewers of the channel showing the results of the selections. The program source may also download a screen template to each individual subscriber who participated, for example, acknowledging the sale and/or indicating the balance of the viewer's account.

As shown in FIG. 3G, an interactive template screen can be implemented in conjunction with a game show to prompt the viewer for a response related thereto, for example, the answer to a question posed to the contestants of the game show. As shown, the template screen prompts the viewer for a response to a question in the game show Jeopardy.

The viewer uses the number keys to enter an answer to the question and records the answer, for example, by pressing the [Select] button on the remote control 126.

The microprocessor 128 generates return path data according to the recorded answer input by the viewer and communicates the return path data together with the template identifier to the program source 60 via the return path communication link.

The program source 60 may process the return path data and correlate the results of the answers among the various participating subscribers. The program source may then download a second screen template globally to all viewers of the channel showing the results of the answers. The program source may also download a screen template to each individual subscriber who participated indicating the correct answer to the question.

As shown in FIG. 3H, an interactive template screen can be implemented in conjunction with a murder mystery television program to prompt the viewer for a response related thereto. As shown, the template screen prompts the viewer for a response to a question of who committed the murder.

The viewer uses the number keys to enter an answer to the question and records the answer, for example, by pressing the [Select] button on the remote control 126.

The microprocessor 128 generates return path data according to the recorded answer input by the viewer and communicates the return path data together with the template identifier to the program source 60 via the return path communication link.

The program source 60 may process the return path data and correlate the results of the answers among the various participating subscribers. The program source may then download a second screen template globally to all viewers of the channel showing the results of the answers. The program source may also download a screen template to each individual subscriber who participated indicating the correct answer to the question.

Conceivably, the program source 60 may also vary the outcome of the murder mystery as shown to the viewers according to the correlated results. The outcome of the murder mystery can be varied manually by a system operator who selects one of a multiple of pretaped endings according to the correlated results. The outcome of the murder mystery may also be varied automatically. For example, the program source may store multiple pretaped endings on a plurality of VCRs, and a controller selectively controls the VCRs to play the appropriate pretaped ending according to the correlated results.

As shown in FIG. 3I, an interactive template screen can be implemented in conjunction with television gambling. As shown, the template screen prompts the viewer to pick a winner and a wager amount for a horse race.

The viewer uses the number keys to enter the winner and the wager amount and records the bet, for example, by pressing the [Select] button on the remote control 126.

The microprocessor 128 generates return path data according to the recorded bet and communicates the return path data together with the template identifier to the program source 60 via the return path communication link.

The program source 60 may process the return path data and correlate the results of the horse race among the various participating subscribers. The program source may then download a second screen template globally to all viewers of the channel showing the results of the betting on the horse race. The program source may also download a screen template to each winning subscriber indicating the amount won. The principles of the invention of FIG. 3I may be extended to other forms of gambling such as roulette and craps, the terminal 14 being provided with a receptacle for a cash debit card that is credited or debited based on the results of a wager.

And as shown in FIG. 3J, an interactive template screen can be implemented in conjunction with a video game downloaded from the program source 60 or the system manager 22 to the subscriber terminal 14, for example to inform a participant that he/she has scored a top score and to prompt the participant for a response related thereto. The video game may be stored in a memory of the subscriber terminal 14, such as DRAM 137 or NVM 134, and played by a participant by viewing the associated television 20. The video game may be downloaded per parent U.S. patent application Ser. No. 07/983,909, or as taught by U.S. Pat. No. 5,235,540. The program source 60 or system manager 22 may control the amount of time the downloaded video game remains stored in the memory of the subscriber terminal as described in pending U.S. patent application Ser. No. 07/896,582, entitled "Method and Apparatus for Providing Periodic Subscription Television Services", filed Jun. 10, 1992 and incorporated herein by reference. When the participant scores a high score, which may be determined from a score value downloaded from the program source 60 or system manager 22, the microprocessor 128 may then generate return path data according to high score achieved by the participant and communicate the return path data together with a template identifier associated with the video game to the program source 60 or system manager 22 via the return path communication link.

The program source 60 or system manager 22 may then process the return path data and download the template screen of FIG. 3J along with the template identifier to the subscriber terminal 14. As shown, the template screen displays the high score of the participant and the top five scores of participants of the video game on demand service, and prompts the participant to enter his/her name to update the list of current high scores.

The participant uses the ← → ↑ ↓ keys to enter his/her name and records the name, for example, by pressing the [Select] button on the remote control 126.

The microprocessor 128 generates return path data according to the recorded name input by the participant and communicates the return path data together with the template identifier to the program source 60 or system manager 22 via the return path communication link.

The program source 60 or system manager 22 may process the return path data and correlate the participant's high score and name with the list of current high scores. The program source may then download a second screen template to the participant showing an updated list of high scores.

FIGS. 3K and 3L show template screens used in connection with the interactive communication of data accumulated by the subscriber according to the first embodiment of the present invention as described above. The template screens of FIGS. 3K and 3L are downloaded along with a template identifier from the system manager 22 to the subscriber terminal 14, and displayed in place of or overlaid on the composite video signal.

As shown in FIG. 3K, an interactive template screen can be implemented in conjunction with an interactive energy management program. The subscriber terminal 14 may accumulate energy management data via data port 140 from a temperature and/or humidity control system within the subscriber's location 70. The energy management data may, for example, allow the system manager 22 to control the temperature control system at the subscriber's location 70. As shown, the template screen prompts the viewer to update the current settings of the energy management data.

The viewer uses the number keys to enter the selections and records the selections, for example, by pressing the [Select] button on the remote control 126.

The microprocessor 128 generates return path data according to the recorded selections input by the viewer and communicates the return path data together with the template identifier to the system manager 22 via the return path communication link.

The system manager 22 processes the return path data and communicates commands to the subscriber terminal 14 to control the temperature and/or humidity control system within the subscriber's location 70 via data port 140 according to the updated energy management data.

And as shown in FIG. 3L, an interactive template screen can be implemented in conjunction with a burglar/fire alarm system at the subscriber's location 70. The subscriber terminal 14 may accumulate burglar/fire alarm control data via data port 140 from a burglar/fire alarm system within the subscriber's location 70. The burglar/fire alarm control data may, for example, allow the system manager 22 to activate/deactivate the burglar/fire alarm control system at the subscriber's location 70. As shown, the template screen prompts the viewer to update the current settings of the burglar/fire alarm control data.

The viewer uses the number keys to enter the selections and records the selections, for example, by pressing the [Select] button on the remote control 126.

The microprocessor 128 generates return path data according to the recorded selections input by the viewer and communicates the return path data together with the template identifier to the system manager 22 via the return path communication link.

The system manager 22 processes the return path data and communicates commands to the subscriber terminal 14 to activate/deactivate the burglar/fire alarm system within the subscriber's location 70 via data port 140 according to the burglar/fire alarm control data.

Once activated, the burglar/fire alarm system may detect an intruder/fire and forward an alarm control signal to the subscriber terminal 14 via data port 140. The microprocessor 128 may then generate return path data according to the alarm control signal input from the burglar/fire alarm signal and communicate the return path data together with the template identifier to the system manager 22 via the return path communication link. The system manager 22 may then process the return path data and notify the proper authorities of the event.

Moreover, in accordance with the present invention, an interactive display can be obtained from a virtual channel composed of a composite video signal and a text stream. Furthermore, if the subscriber terminal is provided with two or more tuners 100 (not shown), an interactive display can be obtained from a virtual channel composed of plurality of composite video signals simultaneously with text and or graphics. In fact, the system operator may construct an interactive display from a virtual channel having any combination of services on the selected bandwidth. Additional details of the on-screen display of virtual channels are discussed in application Ser. No. 08/229,805, filed concurrently herewith and incorporated herein by reference.

Figure 5A:
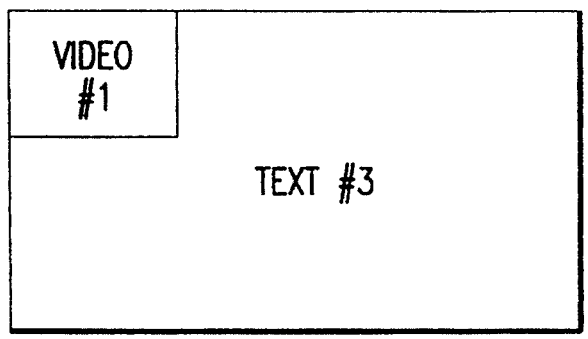
FIG. 5A illustrates the interactive display obtained from a virtual channel composed of video #1 and text stream #3.

As shown in FIG. 5A, an interactive display can be obtained from a virtual channel composed of a composite video signal #1 and a text stream #3. Such an interactive display is applicable, for example, to a video based real estate shopping network. The composite video signal #1 may, for example, present various views of a house that is currently for sale. The text stream #3 provides details of the house, for example, the address, asking price, number of rooms, size of each of the rooms, type of heat, etc. The text stream #3 may also provide an interactive template along with a template identifier. The interactive template prompts the viewer for a response related to the house currently shown by the video signal #1. For example, the interactive template may query if the viewer would like more specific details regarding the house currently shown.

The viewer uses the number keys and/or the cursor direction keys to enter the appropriate selection and records the selections, for example, by pressing the [Select] button on the remote control 126.

The microprocessor 128 then generates return path data according to the recorded selections input by the viewer and communicates the return path data together with the template identifier to the system manager 22 via the return path communication link.

The system manager 22 processes the return path data and downloads data to the individual subscriber terminal 14 to provide the more specific details regarding the house currently shown in composite video signal #1. The principles of displaying combined video and text may be extended to all applications already described including, but not limited to gaming, gambling and educational applications.

Figure 5B:
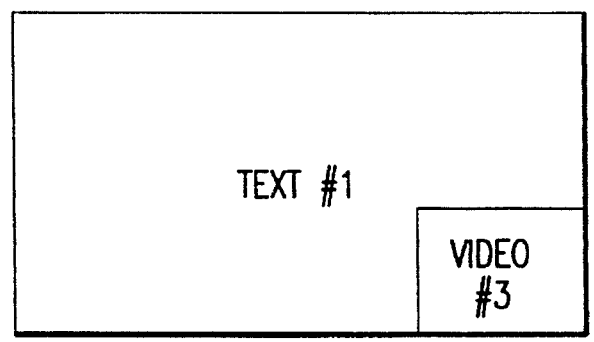
FIG. 5B illustrates the interactive display obtained from a virtual channel composed of video #3 and text stream #1.

Similarly, FIG. 5B illustrates an interactive display obtained from a virtual channel composed of a composite video signal #3 and a text stream #1. And FIG. 5C illustrates an interactive display obtained from a virtual channel composed of a composite video signal #4 and a text stream #2.

Figure 5C:
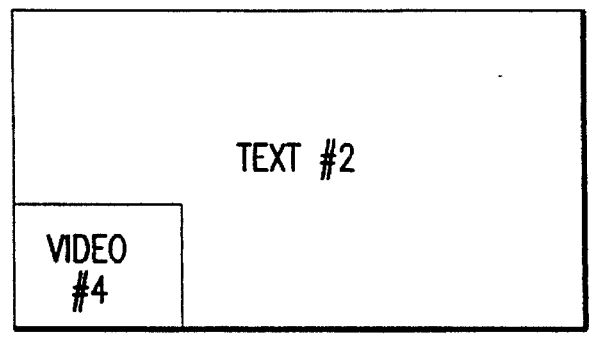
FIG. 5C illustrates the interactive display obtained from a virtual channel composed of video #4 and text stream #2.

In a home shopping arrangement, three of the four panels of a display according to FIGS. 5A–5C may individually display, for example, items of clothing which come in various sizes and colors, while the fourth panel may provide an interactive template for entry of size, color, quantity, and price.

Although illustrative embodiments of the present invention have been described in detail with reference to the accompanying drawings, it is to be understood that the invention is not limited to those precise embodiments and that changes and modifications may be effected therein by those in the art without departing from the scope and spirit of the invention. Moreover, any application or patent cited herein should be considered to be incorporated by reference as to any subject matter deemed essential to the present disclosure.

What is claimed is:

1. System apparatus for providing interactive services in a subscription television system comprising:

a system network controller for controlling the interactive services, the system controller particularly comprising:

controller memory for storing subscriber terminal identification data, transaction identification data and transaction return data, a processor, coupled to said controller memory, for generating a transaction having interactive transaction data and transaction identification data, for correlating received transaction return data with at least said transaction identification data and for calculating summary data therefrom, a first transmitter, coupled to said processor, for transmitting said transaction to terminal apparatus, and a first receiver for receiving transaction return data from terminal apparatus, a video signal source for transmitting a video signal to the terminal apparatus, and terminal apparatus, coupled to the first transmitter and the video signal source, for receiving the video signal, the interactive transaction data and the transaction identification data, the terminal apparatus particularly comprising:

data input circuitry for receiving transaction return data, terminal memory for storing pay-per-view data and said transaction return data associated with said transaction identification data, a terminal controller, coupled to said data input circuitry and said memory, and a data return transmitter for returning said associated transaction return data and said transaction identification data to said first receiver of the system network controller, said terminal controller for determining completion of entry of transaction return data for a particularly identified transaction and, immediately after data entry completion, initiating data return by the data return transmitter.

2. The system of claim 1, wherein said system network controller is part of a program source of said subscription television system.

3. The system of claim 1, wherein said system network controller is part of a headend of said subscription television system.

4. The system of claim 1, wherein said subscription television system comprises a central office coupled to at least one headend, wherein said system network controller is part of said central office.

5. The system of claim 1, wherein the transaction identification data comprises a template number and transaction return data comprises subscriber entered data associated with said template.

6. The system of claim 5, wherein said subscriber entered data comprises polling data.

7. The system of claim 5, wherein said subscriber entered data comprises gambling data.

8. The system of claim 1, wherein said video signal source transmits an educational television program and said transaction return data comprises responses to questions associated with said educational television program.

9. The system of claim 1, said terminal apparatus further comprising a display controller responsive to said terminal controller for overlaying said template over a received video signal.

10. The system of claim 1, said terminal further comprising a real time clock, wherein said transaction identification data identifies said transaction as one requiring the collection of transaction return data at a particular real time of day and data entry completion is signaled by said real time of day.

11. The system of claim 10, wherein said transaction return data comprises channel and data stream viewing data.

12. The system of claim 10, wherein said transaction return data comprises energy management data.

13. The system of claim 1, said data input circuitry is coupled to an alarm sensing device, said transaction identification data identifies an alarm service.

14. The system of claim 13, wherein data entry completion is signaled by the occurrence of an alarm.

15. The system of claim 1, wherein said video signal source transmits video images of items offered for sale, said transaction identification data comprises an item number and data entry completion is signalled by the occurrence of receipt of all of complete item description, quantity and price data associated with subscriber identification data.

16. The system of claim 1, wherein said video signal source transmits video games, said transaction identification data at least identifies the video game.

17. A method for providing interactive services between a central source and a subscriber terminal of a subscription television system, comprising the steps of:

generating a transaction having interactive transaction data and transaction identification data at said central source;

downloading said transaction to said subscriber terminal;

determining completion of entry of transaction return data for a particularly identified transaction;

communicating said transaction return data and said transaction identification data to said central source; and correlating received transaction return data with at least said transaction identification data at said central source.

18. The method of claim 17 further comprising the step of:

calculating summary data at said central source according to said correlating step.

19. The method of claim 18 further comprising the steps of:

generating a second transaction at said central source according to said summary data; and downloading said second transaction to said subscriber terminal.

20. The method of claim 17, wherein said central source is a program source of said subscription television system.

21. The method of claim 17, wherein said central source is a headend of said subscription television system.

22. The method of claim 17, wherein said subscription television system comprises a central office coupled to at least one headend, wherein said central source is said central office.

23. The method of claim 17, wherein the transaction identification data comprises a template number and transaction return data comprises subscriber entered data associated with said template.

23. The method of claim 23, wherein said subscriber entered data comprises polling data.

25. The method of claim 23, wherein said subscriber entered data comprises gambling data.

26. The method of claim 23, wherein said transaction return data comprises responses to questions associated with an educational television program received by said subscriber terminal.

27. The method of claim 17, wherein said subscriber terminal comprises a real time clock, said transaction identification data identifies said transaction as one requiring the collection of transaction return data at a particular real time of day and data entry completion is signaled by said real time of day.

28. The method of claim 27, wherein said transaction return data comprises channel and data stream viewing data.

29. The method of claim 27, wherein said transaction return data comprises energy management data.

30. The method of claim 17, wherein said subscriber terminal comprises data input circuitry coupled to an alarm sensing device, said transaction identification data identifies an alarm service.

31. The method of claim 30 wherein data entry completion is signaled by the occurrence of an alarm.

32. The method of claim 17, wherein said transaction identification data comprises an item number of items offered for sale in a program received by said subscriber terminal and data entry completion is signaled by the occurrence of receipt of all of complete item description, quantity and price data associated with subscriber identification data.

33. The method of claim 17, wherein said transaction identification data at least identifies a video game received by said subscriber terminal.

34. A method of communicating interactive information between a central source and a subscriber terminal of a subscription television system, the method comprising the steps of:

downloading a template screen along with a template identifier from said central source to said subscriber terminal;

storing said template screen and said template identifier in an interactive buffer within said subscriber terminal;

selectively generating on-screen character and graphics displays in place of or overlaid on the composite video signal according to said template screen stored in said interactive buffer;

determining that a viewer has entered a selection or a timeout period has expired;

generating return path data according to said selection by the viewer; and communicating said return path data together with said template identifier to said central source via a return path communication link.

35. The method of claim 34, wherein the template screen includes interactive fields which represent one of blank fields which may be completed by the viewer and choices from which the viewer can make selections, said method further comprising the step of designating that one or more of the interactive fields is to be uniquely displayed.

36. The method of claim 34, wherein said central source is a program source of said subscription television system.

37. The method of claim 34, wherein said central source is a headend of said subscription television system.

38. The method of claim 34, wherein said subscription television system comprises a central office coupled to at least one headend, wherein said central source is said central office.

39. A subscriber terminal for communicating interactive information between a central source and the subscriber terminal for use in a subscription television system, comprising:

means for receiving a template screen along with a template identifier from said central source;

means for storing said template screen and said template identifier in an interactive buffer;

selectively generating on-screen character and graphics displays in place of or overlaid on the composite video signal according to said template screen stored in said interactive buffer;

means for determining that a viewer has entered a selection or that a timeout period has expired;

means for generating return path data according to the selection by the viewer; and means for transmitting said return path data together with said template identifier to said central source via a return path communication link.

40. The subscriber terminal of claim 39, wherein the template screen include interactive fields which represent one of blank fields which may be completed by the viewer and choices from which the viewer can make selections, said subscriber terminal further comprising means for designating that one or more of the interactive fields is to be uniquely displayed.

41. The subscriber terminal of claim 39, wherein said central source is a program source of said subscription television system.

42. The subscriber terminal of claim 39, wherein said central source is a headend of said subscription television system.

43. The subscriber terminal of claim 39, wherein said subscription television system comprises a central office coupled to at least one headend, wherein said central source is said central office.

* * * * *